United States Patent
Park et al.

(10) Patent No.: US 7,945,208 B2
(45) Date of Patent: May 17, 2011

(54) RADIO FREQUENCY INTEGRATED CIRCUIT

(75) Inventors: Joonbae Park, Seoul (KR); Kyeongho Lee, Seoul (KR); Yido Koo, Seoul (KR); Jeong Woo Lee, Seoul (KR)

(73) Assignee: GCT Semiconductor, Inc., San Jose, CA (US)

( * ) Notice: Subject to any disclaimer, the term of this patent is extended or adjusted under 35 U.S.C. 154(b) by 802 days.

(21) Appl. No.: 11/889,355

(22) Filed: Aug. 10, 2007

(65) Prior Publication Data

US 2008/0161073 A1   Jul. 3, 2008

(30) Foreign Application Priority Data

Aug. 14, 2006 (KR) .................. 10-2006-0076538

(51) Int. Cl.
*H04W 88/02* (2009.01)

(52) U.S. Cl. ........................... 455/41.2; 455/78
(58) Field of Classification Search .......... 455/78, 455/566, 41.2; 715/783; 701/208; 708/206
See application file for complete search history.

(56) References Cited

U.S. PATENT DOCUMENTS

| | | | |
|---|---|---|---|
| 5,973,944 A * | 10/1999 | Nork | 363/60 |
| 7,680,227 B2 * | 3/2010 | Kavadias et al. | 375/354 |
| 7,723,969 B1 * | 5/2010 | Li | 323/276 |
| 2002/0120302 A1 * | 8/2002 | Lyden | 607/9 |
| 2004/0061380 A1 * | 4/2004 | Hann et al. | 307/43 |
| 2004/0150944 A1 * | 8/2004 | Byrne et al. | 361/683 |
| 2008/0141072 A1 * | 6/2008 | Kalgren et al. | 714/33 |
| 2009/0174381 A1 * | 7/2009 | Ojanen et al. | 323/282 |

* cited by examiner

*Primary Examiner* — Diane Mizrahi
(74) *Attorney, Agent, or Firm* — Muir Patent Consulting, PLLC

(57) ABSTRACT

Embodiments of an RFIC and methods for same and mobile terminals can internally reduce an input voltage to provide a prescribed voltage to a radio frequency transceiver. Embodiments of an RFIC can have a high efficiency and/or a low noise. In one embodiment, a device can include a PMIC and an RFIC. The RFIC can include an RF transceiver to carry out an RF transmission and an RF reception, a DC-DC converter to lower a voltage provided by the PMIC, and an LDO regulator to regulate the lowered voltage to a fixed voltage used by the RF transceiver.

10 Claims, 3 Drawing Sheets

RADIO FREQUENCY INTEGRATED CIRCUIT

FIELD OF THE INVENTION

The application relates to a radio frequency integrated circuit (referred to as "RFIC" hereinafter).

BACKGROUND OF THE INVENTION

A related art RFIC is manufactured using a CMOS process that includes only devices using a low input voltage. The RFIC may be used for a mobile phone. However, the mobile phone uses a high voltage (e.g., battery). Accordingly, a RFIC is needed that can be utilized with a high voltage.

SUMMARY OF THE INVENTION

An object of embodiments of the application is to solve at least problems and/or disadvantages in the related art or to provide at least the advantages described herein in whole or in part.

An object of the application is to provide embodiments of an RFIC and methods that may internally reduce an input voltage.

Another object of the application is to provide an RFIC wherein a power consumed by a voltage reduction in the RFIC is reduced so as to be applicable to a portable mobile terminal.

Another object of the application is to provide an RFIC wherein a power consumed by a voltage reduction in the RFIC is reduced so as to be applicable to a portable mobile terminal such as a mobile phone that is sensitive to a power consumption.

Another object of the application is to provide an RFIC that has a low noise in a voltage obtained by a voltage reduction carried out in the RFIC, for example, to protect an RF transceiver that is sensitive to a noise.

To achieve objects of embodiments of the application in whole or in part, there is provided a system that can include an RF transceiver to perform an RF transmission and an RF reception, a DC-DC (direct current to direct current) converter to reduce a voltage provided by a power management integrated circuit and an LDO regulator to receive a voltage from the DC-DC converter and output a regulated voltage to the RF transceiver.

To achieve objects of embodiments of the application in whole or in part, there is provided mobile terminal that can include an antenna, a power management integrated circuit (PMIC) to receive an input voltage and output a first reduced voltage and a radio frequency integrated circuit (RFIC) coupled to the PMIC and the antenna, the RFIC including an RF transceiver to perform an RF transmission or an RF reception, a DC-DC converter to receive the first reduced voltage provided by the PMIC to output a second reduced voltage, and an LDO regulator to receive the second reduced voltage from the DC-DC converter and output a third reduced voltage to the RF transceiver.

To achieve objects of embodiments of the application in whole or in part, there is provided method that can include receiving and transmitting signals using an antenna in a mobile terminal, receiving an input voltage and outputting a first reduced voltage using a power management integrated circuit (PMIC) and performing an RF transmission or an RF reception using a radio frequency integrated circuit (RFIC) and the signals, wherein performing includes converting the first reduced voltage provided by the PMIC and outputting a second reduced voltage using a DC-DC converter, regulating the second reduced voltage from the DC-DC converter and outputting a third reduced voltage to a RF transceiver using an LDO regulator and performing the RF transmission or the RF reception using the RF transceiver and the third reduced voltage.

A voltage reduced by the LDO regulator can be smaller than a voltage reduced by the DC-DC converter and larger than zero. A power management integrated circuit is manufactured via high voltage process and a RF transceiver, a DC-DC converter and a LDO regulator are manufactured via a standard CMOS (complementary metal oxide semiconductor) process. A voltage provided by a power management integrated circuit to a DC-DC converter can be no less than 2.4V and no more than 3.3V, and may be 2.8V for instance. In addition, a power management integrated circuit and a radio frequency integrated circuit can be manufactured in separate chips or on separate dies.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Embodiments according to the application will be described with reference to the accompanying drawings. Such embodiments are exemplary and not to be construed as limiting. Many alternatives, modifications, and variations will be apparent to those skilled in the art.

Figure 1:
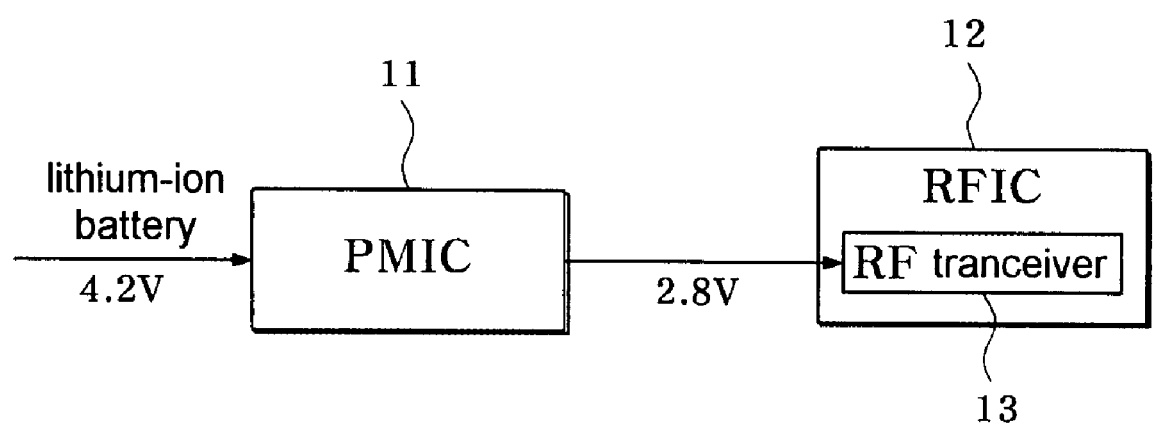
FIG. 1 is a diagram illustrating a related art power management integrated circuit and a related art radio frequency integrated circuit.

FIG. 1 is a diagram illustrating a related art PMIC and a related art RFIC that may be used for a mobile phone. Referring to FIG. 1, a PMIC 11 receives a voltage of 4.2V from a lithium-ion battery and outputs a voltage of 2.8V to an RFIC 12. The PMIC 11 refers to an integrated circuit including at least one regulator and a regulator control circuit. The PMIC is a power circuit that is manufactured via a high voltage process rather than a standard CMOS process.

The standard CMOS process refers to a CMOS process that only includes devices that operate under 3.3V. For instance, in case of a 0.13 µm standard CMOS process, a transistor having a minimum line width of 0.13 µm is used for a core circuit, and transistors having a minimum line width of 0.25 µm or 0.35 µm in addition to 0.13 µm is used for an I/O circuit.

In case of the transistor having the minimum line width of 0.25 µm, a supply voltage should be no more than 2.5V, and in case of the transistor having the minimum line width of 0.35

µm, the supply voltage should be no more than 3.3V in most cases. An output voltage of a battery widely used in the mobile phone is 4.2V and may be up to 5V in case of an overcharge. Therefore, devices that tolerate a high voltage such as 5V should be used when a power is supplied from the battery.

Since a complexity and a cost of a process are increased when devices that tolerate a voltage ranging from 4V to 5V are integrated in the standard CMOS process, most of the standard CMOS processes do not provide high voltage devices. In addition, when the supply voltage is directly inputted, a short circuit prevention circuit and a voltage converter (e.g., a LDO regulator or a DC-DC converter) having a function of a thermal shutdown should be used to prevent an overheating of an internal circuit and the battery. Thus, one reason that the PMIC 11 is used is to simplify an embodiment of the RFIC 12 by manufacturing the voltage converter that satisfies a high voltage requirement and the above-described function.

The RFIC 12 comprises an RF transceiver 13. The RF transceiver 13 is a circuit used for an RF transmission and an RF reception, which may comprise an up-conversion mixer, a power amplifier, a low noise amplifier, a down-conversion mixer and a filter. The RF transceiver 13 included in the RFIC 12 uses a voltage of 2.8V provided from the PMIC 11. The RFIC 12 is manufactured via the standard CMOS process instead of the high voltage process used for manufacturing the PMIC 11.

As described above, the related art RFIC 12 uses the voltage provided from the PMIC 11. However, other requirements are generated in developing a real product. More specifically, in developing the mobile phone, a verified PMIC is maintained or not changed but the RFIC changes by using RFICs supplied from several companies or RFICs of various versions supplied from one company. In this case, the voltage supplied by the PMIC and the voltage used by the RF transceiver of the RFIC may be different. For instance, an initial version of the RFIC may use the voltage of 2.8V provided from the PMIC while an updated or improved version of the RFIC may be required to receive a voltage of 1.2V because of the processing manufacture production line width e.g., use of the 0.13 µm process. In such case, when the PMIC is replaced by a different PMIC outputting the voltage of 1.2V, a problem may not occur. However, a company that develops the mobile phone may desire to use the verified PMIC because a long time and a high cost are needed to verify the PMIC outputting the voltage of 1.2V and apply the same to the mobile phone. Therefore, the RFIC is required to receive a voltage that is higher than the voltage used in the RF transceiver and reduce the received voltage to the voltage used in the RF transceiver, which cannot be achieved by the related art RFIC. More specifically, while the related art RFIC receives the voltage provided by the PMIC to be used as the supply voltage of the internal circuit, the RFIC that uses the voltage lower than the voltage provided from PMIC requires a voltage reduction circuit that reduces the supply voltage from internal or external PMIC.

Figure 2:
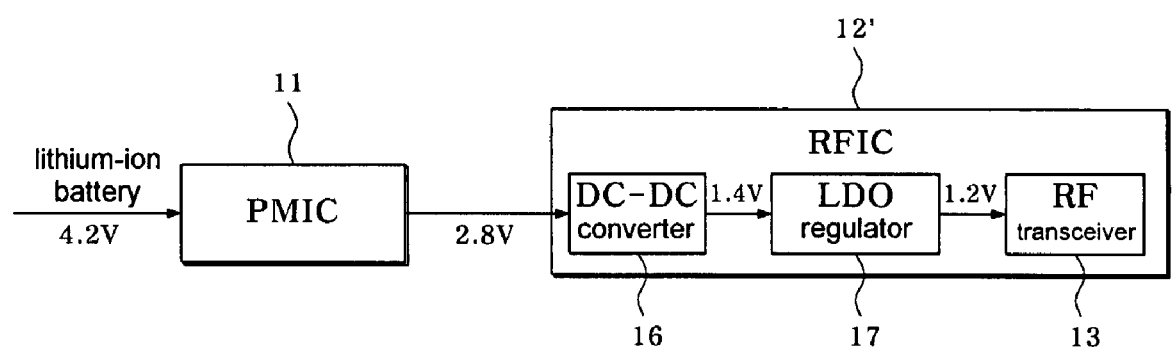
FIG. 2 is a diagram illustrating a radio frequency integrated circuit in accordance with en embodiment of the application.

FIG. 2 is a diagram illustrating an embodiment of a radio frequency integrated circuit in accordance with the application. As shown in FIG. 2, the RFIC (radio frequency integrated circuit) 12' can include a DC-DC converter 16, a LDO (low dropout) regulator 17 and a RF transceiver 13.

The DC-DC converter 16 can reduce an input voltage provided from a PMIC (power management integrated circuit) 11 to be transmitted to the LDO regulator 17. The DC-DC converter 16 generally includes a switch, an inductor and a capacitor. However, embodiments of the application are not intended to be limited by such an exemplary disclosure. For instance, a buck converter may be used as the DC-DC converter. An inductorless DC-DC converter may be used as the DC-DC converter 16. When the DC-DC converter does not include the inductor, an EMI (electromagnetic interference) problem may not occur. A ratio of input voltage and an output voltage of the inductorless DC-DC converter is 1/n, for instance, where n is an integer equal to or higher than 2. Therefore, n can be determined by considering the voltage provided from the PMIC 11 and a voltage used by the RF transceiver 13. It is preferable that n is 2 since the voltage (e.g., 2.8V) provided from the PMIC 11 is more than two times higher than the voltage used in the RF transceiver 13 (e.g., manufactured using a 1.3 µm or 0.9 µm standard CMOS process) in most cases.

The LDO regulator 17 can receive the voltage being outputted by the DC-DC converter 16 and regulate the voltage to a fixed voltage (e.g., used by the RF transceiver 13) to be provided to the RF transceiver 13. The LDO regulator 17 is a linear regulator that can maintain the output voltage within a predetermined range.

The RF transceiver 13 receives the voltage being outputted by the LDO regulator 17 and carries out an RF transmission and an RF reception. The RF transceiver 13 may comprise an up-conversion mixer, a power amplifier, a low noise amplifier and a down-conversion mixer. However, embodiments of the application are not intended to be limited by such an exemplary disclosure.

Since the LDO regulator 17 can be a type of the linear regulator, a voltage drop is generated in the LDO regulator 17. Therefore, the voltage provided from the PMIC 11 can be reduced to the voltage used in the RF transceiver 13 using only the LDO regulator 17 without using the DC-DC converter 16. However, contrary to embodiments according to the application that use the DC-DC converter 16 and the LDO regulator 17, when only the LDO regulator 17 is used to reduce the voltage, a relatively large amount of power loss is generated in the LDO regulator 17.

For example, while the DC-DC converter 16 has a low power loss despite the voltage drop (e.g., because of a high efficiency), the LDO regulator 17 has a large power loss that corresponds to a product of a voltage drop (e.g., a difference between the input voltage and the output voltage of the LDO regulator) and a current. When the voltage drop of the LDO regulator 17 is larger than the voltage used by the RF transceiver 13, more power loss occurs in the LDO regulator 17 than the RF transceiver 13. An RFIC 12" using only the LDO regulator 17' generates a large power loss, and the RFIC 12" using only the LDO regulator 17' is not suitable for a mobile communication terminal and the RF transceiver 13 that requires a stable operation.

Therefore, to reduce or minimize the power loss of the LDO regulator 17, the voltage drop at the LDO regulator 17 should be reduced. Accordingly, the RFIC 12' preferably can include the DC-DC converter 16 and the LDO regulator 17. It is preferable that the voltage drop at the LDO regulator 17 is smaller than that of the DC-DC converter 16 (e.g., the difference between the input voltage and the output voltage). For example, the voltage drop at the LDO regulator 17 is more than zero and smaller than the voltage drop at the DC-DC converter (e.g., DC-DC converter 16).

Since the power loss is small in the DC-DC converter 16 and a majority or main voltage drop can occur in the DC-DC converter 16, a voltage regulation using only the DC-DC converter 16 without using the LDO regulator 17 may be considered. However, contrary to embodiments according to the application that can employ the DC-DC converter 16 and the LDO regulator 17, when the voltage is reduced using only the DC-DC converter 16, a voltage ripple can be outputted from the DC-DC converter 16 to act as noise such that a performance of the RF transceiver 13 is degraded. For example, while the LDO regulator 17 that is the linear regulator can output the voltage without a ripple because a switching operation is not carried out therein, the DC-DC converter 16 outputs the voltage having the ripple because the reduction of the voltage is carried out by a switching operation. Therefore, when the output of the DC-DC converter 16 is directly inputted to the RF transceiver 13, a performance of the RF transceiver 13 can be degraded because of the voltage ripple. Therefore, in embodiment according to the application, it is preferable that the RFIC 12' includes the DC-DC converter 16 and the LDO regulator 17.

When the high voltage CMOS process is used to manufacture the DC-DC converter 16 and the LDO regulator 17, and the standard CMOS process is used to manufacture the RF transceiver 13, a manufacturing cost of the RFIC 12' may be very high. Therefore, it is preferable that the standard CMOS process is used to manufacture the DC-DC converter 16, the LDO regulator 17 and the RF transceiver 13. Further, the voltage inputted to the RFIC 12' is preferably limited to less than a predetermined voltage (e.g., 3.3V) that allows the use of the standard CMOS process. It is also preferable that the RFIC 12' that is manufactured using the standard CMOS process and the PMIC 11 that is manufactured using the high voltage process are manufactured on separate chips or dies.

When the voltage outputted by the DC-DC converter 16 is lower than the voltage used in the RF transceiver 13, the LDO regulator 17 may output a voltage that is lower than the voltage used in the RF transceiver 13 to the RF transceiver 13. However, since this way of operation is not desired, the voltage outputted by the DC-DC converter 16 is preferably maintained higher than the voltage used in the RF transceiver 13. That is, even when the ripple of the output voltage of the DC-DC converter 16, an error of the voltage transmitted to the DC-DC converter 16 from the PMIC 11, and the voltage inputted to the DC-DC converter 16 are constant, it is preferable that the output voltage of the DC-DC converter 16 is higher than the voltage used in the RF transceiver 13 considering (e.g., to compensate) an error generated at the output of the DC-DC converter 16 according to a variation in process condition.

In one example, a voltage of 2.8V is provided to the RFIC 12' from the PMIC 11, the DC-DC converter 16 converts the voltage of 2.8V to a voltage of 1.4V, and the LDO regulator 17 regulates the voltage of 1.4V being outputted from the DC-DC converter 16 to a voltage of 1.2V to be provided to the RF transceiver 13. The example is shown in FIG. 2.

It is preferable that the output voltage of the PMIC 11 is between 2.4V to 3.3V. 3.3V is a maximum tolerance voltage of the RFIC 12' manufactured using a 1.3 μm standard CMOS process or a 0.9 μm standard CMOS process. In addition, when the output voltage of the DC-DC converter 16 corresponds to one half of the input voltage thereof, and the RFIC 12' manufactured using the 1.3 μm standard CMOS process or the 0.9 μm standard CMOS process that uses the voltage of 1.2V, the voltage of 2.4V can be a minimum voltage to provide a voltage of no less than 1.2V to the LDO regulator 17. For example, the output voltage of the PMIC 11 may be 2.8V. The voltage of 2.8V is suitable for SiGe RF transceiver that is frequently used and 2.8V can be used as the output voltage of the PMIC 11. Since the PMIC 11 is provided with a voltage ranging from 4V to 5V from a battery, it is preferable that the PMIC 11 is manufactured using the high voltage process.

As described above, embodiments according to the present invention can be effective when the input voltage from the PMIC 11 is high and the voltage used by the RF transceiver 13 of the RFIC 12' is low, which also can be efficient for reducing the power consumption in a standard CMOS process device under 0.13 μm.

Figure 3:
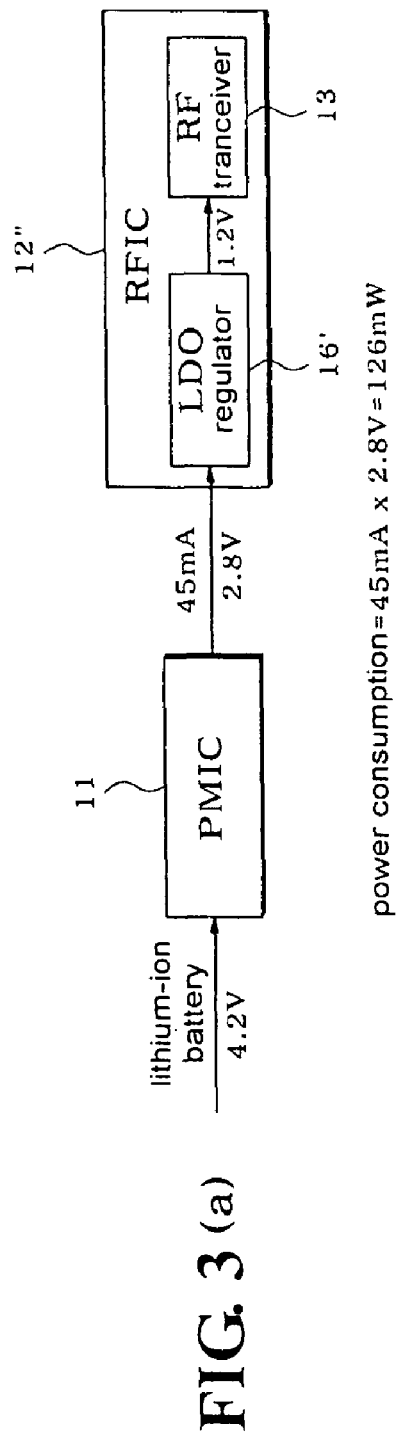
FIGS. 3(a) and 3(b) are diagrams showing a comparison between power consumptions of a radio frequency integrated circuit using only an LDO regulator and radio frequency integrated circuit in accordance with an embodiment of the application.
Figure 3:
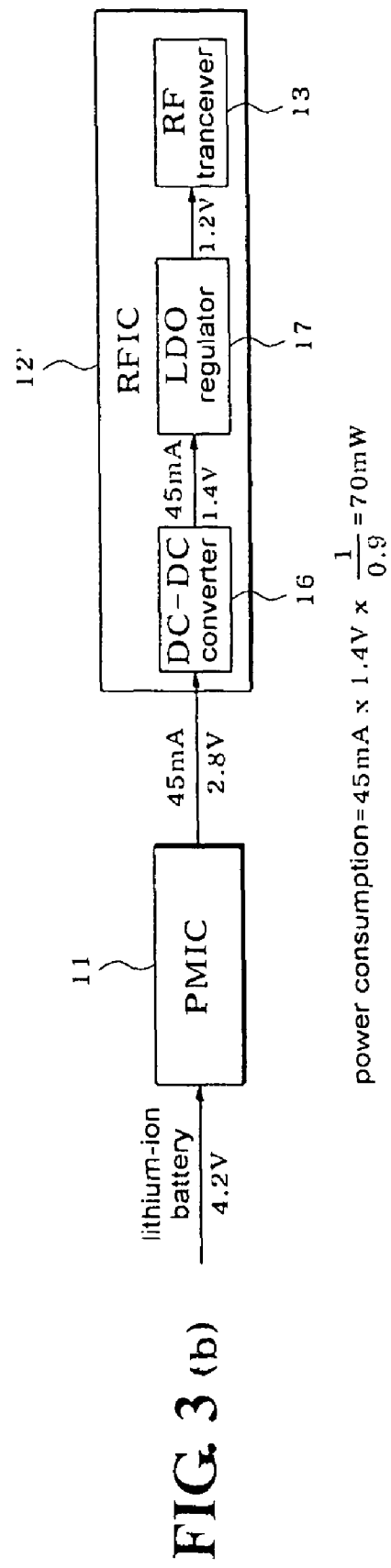

FIGS. 3(*a*)-3(*b*) are diagrams showing a comparison between power consumptions of an RFIC using only the LDO regulator and an RFIC in accordance with one embodiment of the application. When a current consumed by an RFIC 12" is assumed to be 45 mA, the RFIC 12" (a) using only a LDO regulator 17' consumes a power of 45 mA*2.8V=126 mW. The RFIC 12" is shown in FIG. 3(*a*).

When the current consumed by the RFIC 12' is assumed to be 45 mA, and an efficiency of the DC-DC converter is assumed to be 90%, the RFIC 12' of one embodiment can consume a power of 45 mA*1.4V/0.9=70 mW. This exemplary RFIC can be the RFIC 12' shown in FIG. 3(*b*). Therefore, an RFIC in accordance with disclosed embodiments can have a higher efficiency than the RFIC using only the LDO regulator.

As described above, embodiments of an RFIC, an RFIC and PMIC device and methods for the same have various advantages. Embodiments of an RFIC in accordance may reduce an input voltage internally, and a PMIC output voltage may be used as the input voltage even when the PMIC output voltage is fixed and the voltage used by the RF transceiver is much lower than the PMIC output voltage.

In addition, embodiments of an RFIC in accordance with the application may be applied to a portable wireless terminal such as a mobile phone, even a mobile phone that is very sensitive to the power consumption or noise by reducing the power consumed or reducing the voltage internally.

Moreover, embodiments of an RFIC in accordance with the invention can have a low noise because of an internal voltage reduction, and an RF transceiver may be protected. Embodiments according to the application can provide an RFIC having a high efficiency and/or a low noise by internally reducing a voltage from a (e.g., fixed) PMIC.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A radio frequency integrated circuit (RFIC) for use in a device powered by a battery, the RFIC configured to receive a first voltage from a power management integrated circuit (PMIC) of the device, the RFIC comprising:
- a radio frequency (RF) transceiver configured to perform an RF transmission and an RF reception;
- a direct current to direct current (DC-DC) converter configured to reduce the first voltage and output a second voltage lower than the first voltage; and
- a low dropout (LDO) regulator configured to receive the second voltage from the DC-DC converter and output a third voltage to the RF transceiver,
- wherein the ratio of the first voltage to the second voltage is at least 1/n, wherein n is an integer that is 2 or higher, and the third voltage is lower than the second voltage and is greater than zero.

2. The RFIC in accordance with claim 1, wherein the PMIC is coupled to an input of the DC-DC converter and manufactured via high voltage process and the RF transceiver, the DC-DC converter, and the LDO regulator are manufactured via a standard CMOS process.

3. The RFIC in accordance with claim 1, wherein the DC-DC converter is inductorless.

4. The RFIC in accordance with claim 3, wherein the ratio is 0.5.

5. The RFIC in accordance with claim 4, wherein the first voltage is between 2.4V and 3.3V.

6. The RFIC in accordance with claim 5, wherein the first voltage is 2.8V.

7. The RFIC in accordance with claim 1, wherein the PMIC and the RFIC are included in separate chips.

8. The RFIC in accordance with claim 1, wherein the PMIC and the RFIC are included on separate dies.

9. The RFIC of claim 1, wherein:
- the RF transceiver is configured to perform operations using the third voltage, and the third voltage is a different voltage from voltages used to operate other parts of the device.

10. The RFIC of claim 1, wherein:
- the first voltage is between 2.4V and 3.3V, the second voltage is greater than 1.2V, and the third voltage 1.2V or lower.

* * * * *